Sept. 22, 1931.    M. FLEISCHHACKER    1,824,398
HOLDER FOR DENTISTRY WORK
Filed April 9, 1929
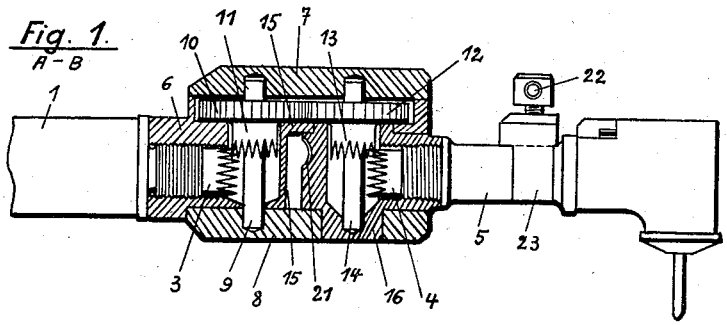
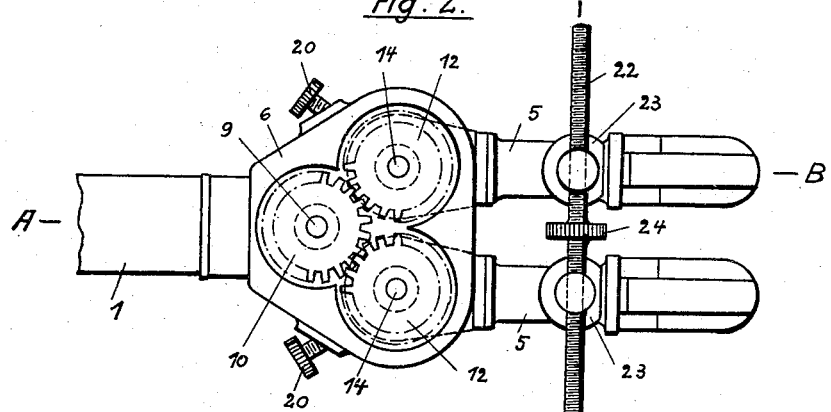
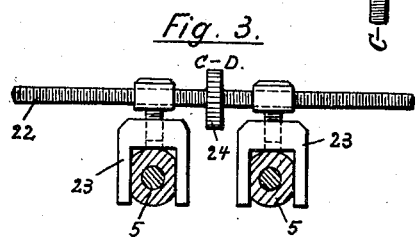 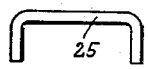
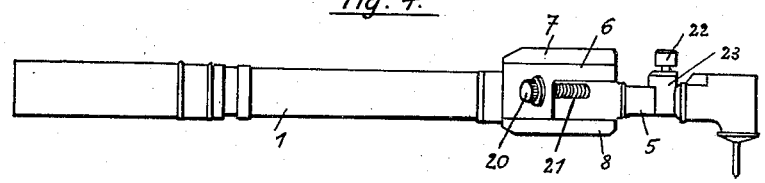
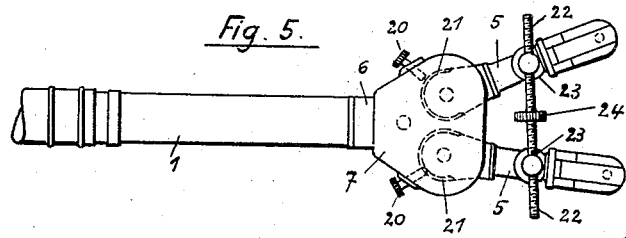
Inventor:

Patented Sept. 22, 1931

1,824,398

UNITED STATES PATENT OFFICE

MAX FLEISCHHACKER, OF HANOVER, GERMANY

HOLDER FOR DENTISTRY WORK

Application filed April 9, 1929, Serial No. 353,714, and in Germany April 17, 1928.

This invention refers broadly to an instrumentality to be employed in the dental art for the simultaneous operation of more than one tool or tool-holders angularly displaceable or rotatable with relation to each other and disposed in or upon a suitable frame or the like carrying the operating means for the tools or tool-holders. Among other important novel features and advantages my invention is distinguished from the previous art by the fact that all the gear wheels, screw-wheels, worms or the like for the operation of the relatively angularly displaceable tools or tool-holders the active parts of which are set or adjusted to cause them to be operated with their axes in an absolutely parallel direction are all contained in tightly closable chambers or housings, and in view thereof it is a further object of my invention to provide for parallel adjustment of said tools or tool-holders and to provide means to exclude the influences of endwise or lateral thrusts on said tools or tool holders and on the active parts thereof, and to so arrange the driving and operating gear wheels or the like that no packing or jamming action on said wheels and on the marginal portions thereof may occur, so as to bring down the parallel and other adjustments to a nicety and practically free from disturbing causes. In accordance with one of the preferred embodiments of my invention the absolutely level and parallel adjustment of the operating tools and of the guiding arms or stems therefor may be obtained by the use of a U-shaped piece of steel wire with parallel legs which latter preferably possess the thickness of a tool-shaft. Other objects of my invention refer to the setting and locking means and the like for the angularly movable and tool-carrying arms which may be secured in position by means of set screws preferably disposed in the frame or casing of the device which is closed on all sides and in which the stems of the screws and the ends of the arms are housed, so as to adapt the ends of said screws to become engaged with suitable screw threads or holes provided in the angularly movable arms, while the heads of said screws are situated outside of the frame or casing. The adjustment of the distance of the two or more tools from each other is effected by a screw spindle which actuates a corresponding number of removable riders or the like which are disposed upon said angularly displaceable arms. Ordinarily the adjustment of the tools will be effected by first locking one of the angularly movable arms in position by the operation of one of the set screws, and by then setting the tools at the proper distance from each other, while the device is in the mouth of the patient and by the operation of the screw spindle referred to. Other important features and advantages will appear from the specification and from an inspection of the annexed drawing showing by way of example one of the possible forms of embodiment of this invention.

Figure 1 of the drawing shows on a somewhat enlarged scale an angle piece or holder according to this invention in elevation with parts in section on the line A—B of Figure 2 in vertical longitudinal section; Figure 2 is a plan view of the device with the covers removed.—Figure 3 is a cross-section on the line C—D of Figure 2, and Figure 4 is a side elevation of the entire device; Figure 5 is a top plan view showing the engagement of the set screws, and the operation of the adjusting screw-spindle. Figure 6 is a detail of the U-shaped setting means.

In the angle-piece or holder shown particularly in Figures 1 to 3 of the drawings a number of parts usually employed in the ordinary angle piece for a single tool have been employed in connection with this invention. Upon the handle 1 with the driving gear wheel 3 a casing 6 is screw-threadedly secured and is tightly closed on all sides by means of the upper cover 7 and the lower cover 8. The screws or bolts connecting the covers to the casing are not shown in the drawings. The shaft 9 is journaled in the covers 7 and 8. A pinion 10 is keyed to the shaft 9 and upon its hub a gear 11 is provided and adapted to engage the driving gear wheel 3. The pinion 10 drives two pinions 12 of equal size (Fig.

2) upon the hubs of which gears 13 are provided, and which are keyed to the driving shafts 14. The wall 15 of the casing within the casing recedes with relation to the shafts and constitutes a partition therebetween, so as to form open spaces for the reception of the caps, housings or sleeves 16. These two caps or the like are mounted at their tops and bottoms in the wall 15 and in the cover 8 respectively. The shafts 14 are journalled at their upper ends in the cover 7 and at their lower ends in the caps 16. Into the said caps or sleeves 16 two or more projecting guide arms 5 for the tools are screw-threadedly secured and are provided with the gear wheels 4. These gear wheels 4 are in engagement with the gear 13 on shaft 14.

The frame or angle piece according to this invention operates substantially as follows:

By means of the gear wheel 3 and by way of the gear 11 motion is imparted to the pinion 10 which in turn drives the two pinions 12 which are mounted for free rotation with their shafts 14 and which, by means of the gearing 13, drive the gear wheels 4 and accordingly the tools of the guide arms 5. The caps or sleeves 16 with the guide-arms or projections 5 are freely rotatable around the shafts 14 in their bearings. The tools, borers and the like for instance, mounted in the guide arms 5 may be moved towards each other until the said guide arms 5 are in contact with each other, or they may be moved away from each other sufficiently to comply with all practical requirements of work to be performed within the mouth of the patient. For the locking of the guide arms or extensions 5 in certain adjusted positions set screws 20 are provided which are mounted in the casing or housing 6 of the device and the ends of which may become engaged with screw threads 21 provided on the guide arms 5 or the caps 16. The adjustment of the distance of the two tools from each other is effected by means of a screw spindle 22 which, by means of the rotation of a nut or wheel 24 mounted on said spindle allows of moving two riders or the like 23 axially of said spindle. These riders, forks or the like are straddlingly mounted upon the two angularly displaceable guide arms or extensions 5.

A U-shaped wire of steel or the like 25 preferably of a thickness equal to that of the stem of the tools to be employed, and the legs of which must be absolutely parallel to each other is used from time to time, and particularly after any possible reparation of the parts for the purpose of watching and ascertaining the parallel direction of the guide arms 5. This is effected by introducing the steel wire into the bores of the guide arms 5.

Instead of using gear operated driving means worms or worm-wheels or the like may be employed. An intermediate elbow piece or the like may be inserted in the device in the same manner as ordinarily employed in angle pieces or holders intended for one tool only.

There is sufficient free space in the device described between and at the side of the guide arms to enable the operator to observe and watch the several stages of operation, and to allow sufficient freedom for the movement of the tongue of the patient.

While I have described a preferred embodiment of my invention by way of exemplification, it should be understood that I intend no limitation upon the invention other than imposed by the scope of the claims hereunto appended.

I claim:—

1. In a device of the kind described, a housing, prime driving means entering the housing at one side thereof, cap-like casings within the housing, movable and adjustable tool-guiding holders extending from the housing and secured to the casings, driving means within said casings and secured to the holders, a partition between the casing and the prime driving means, means operatively connecting the several driving means, and adjusting means intermediate the holders.

2. In a device of the kind described, a housing, prime driving means within the housing, rotatable and adjustable tool holders projecting from said housing, separate driving means on each of said tool holders within the housing and engaging the prime driving means, a cap-like casing for each of said tool holders and secured thereto and enclosing the tool driving means, and means to adjust and to lock the holders in position.

3. In a device of the kind described, a housing, prime driving means within the housing, protecting and encasing means for the prime moving means, two parallel, angularly displaceable tool holders entering the housing and outwardly extending therefrom, driving means, separately disposed on the inner ends of the tool holders within the housing and engaging the prime driving means, a cap-like casing for each of the inner ends of the tool holders surrounding the driving means thereof and rotatable therewith, substantially screw-like locking and setting means on the housing and entering the same and engageable with the tool holders.

MAX FLEISCHHACKER.